United States Patent
Lambert

(10) Patent No.: US 8,156,356 B2
(45) Date of Patent: Apr. 10, 2012

(54) DYNAMIC POWER MANAGEMENT FOR INTERNAL INFORMATION HANDLING SYSTEM LINKS

(75) Inventor: Timothy Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 569 days.

(21) Appl. No.: 12/354,599

(22) Filed: Jan. 15, 2009

(65) Prior Publication Data

US 2010/0180135 A1     Jul. 15, 2010

(51) Int. Cl.
G06F 1/26 (2006.01)
(52) U.S. Cl. .................................. 713/320; 713/324
(58) Field of Classification Search .............. 713/300, 713/310, 320, 323, 324
See application file for complete search history.

(56) References Cited

U.S. PATENT DOCUMENTS

| | | | |
|---|---|---|---|
| 6,795,450 B1 * | 9/2004 | Mills et al. ................ | 370/463 |
| 7,603,574 B1 * | 10/2009 | Gyugyi et al. ............. | 713/300 |
| 2003/0126482 A1 * | 7/2003 | Cruz ........................ | 713/300 |
| 2003/0167413 A1 * | 9/2003 | Stachura et al. .......... | 713/300 |
| 2003/0196126 A1 * | 10/2003 | Fung ........................ | 713/300 |
| 2004/0088590 A1 * | 5/2004 | Lee et al. .................. | 713/300 |
| 2007/0101173 A1 * | 5/2007 | Fung ........................ | 713/300 |
| 2009/0077394 A1 * | 3/2009 | Tsai et al. ................. | 713/310 |
| 2009/0327782 A1 * | 12/2009 | Ballou et al. ............. | 713/330 |
| 2010/0332866 A1 * | 12/2010 | Lee et al. .................. | 713/300 |

* cited by examiner

*Primary Examiner* — Khanh Dang
(74) *Attorney, Agent, or Firm* — Baker Botts L.L.P.

(57) ABSTRACT

In some embodiments, a method for automatically and dynamically controlling the power states of physical layer links (PHYs) in a modular information handling system is provided. A chassis manager automatically determines a status of at least one of the chassis manager and a managed chassis module of a modular information handling system. The chassis manager automatically identifies a PHY power down condition based at least on the determined status of at least one of the chassis manager and the managed chassis module, and in response to identifying the power down condition, the chassis manager powers down one or more management link PHYs associated with a management link between the chassis manager and the managed chassis module.

13 Claims, 2 Drawing Sheets

DYNAMIC POWER MANAGEMENT FOR INTERNAL INFORMATION HANDLING SYSTEM LINKS

TECHNICAL FIELD

The present disclosure relates in general to information handling systems, and more particularly to systems and methods for providing dynamic power management for internal information handling system links (e.g., internal chassis links).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a modular server, such as a blade server or simply "blade." A modular server may include any number of self-contained information handling systems configured to be placed in a single enclosure, or chassis. A modular server chassis may hold multiple servers (e.g., blades) and provide services to the various servers such as power, cooling, networking, interconnects, and management. For example, the chassis may include a plurality of power supply units (PSUs) configured to provide power to blades mounted in the chassis.

A modular server chassis may include a chassis manager, e.g., a chassis management controller (CMC), configured to provide local and/or remote management of various chassis functions. Some modular server chassis include redundant chassis managers such when an active manager fails, the system may automatically fail over to a standby manager, which then becomes the active manager.

Power management is an increasingly important issue regarding modular servers. Most network switch appliances and modular server system I/O modules allow user-defined control of various network configurations on a per port basis. These configurations are typically static in nature, require administrative control, are typically used for security purposes, and/or do not include power down of physical links (PHYs).

Modern modular servers typically have an internal chassis network for management type communication between modules. These links often are utilized under standby power and significantly add to the standby power requirements that customers desire to reduce.

Some modular servers have a number (e.g., 50) of internal management Ethernet links that contribute to the standby and main power draws. In addition, the proliferation of integrated networking into embedded systems on a chip (which are functions such as BMC, IDRAC, etc.) are promoting the use of management Ethernet links in monolithic servers as well. It is common in physical layer communication devices such as Ethernet PHYs and switches that the analog portion of the chip driving the physical link are a large percentage of the chips' overall power draw.

Current products typically leave all networking physical interfaces (Ethernet PHYs, transmitters and receivers) statically powered on and able to link, although passing traffic is typically under chassis manager or user control. Thus, there is a lot of wasted power by leaving transmitters on, for example, when (a) a module has no link partner, (b) a module is not capable of management traffic, (c) a module is not currently powered on, and/or (d) there is no active management traffic.

In addition, out-of-band interfaces (e.g., GPIOs, Time Division Multiplexed Shifty or I2C I/O expanders) exist in parallel to the management links. In some systems, management traffic is typically pushed from the chassis controller (it knows when out-of-bound traffic is required), and when a module has a traffic generating event, it asserts an out-of-band alert for the chassis manager to query via the management fabric to identify the event.

Independent of link status in a modular system, a chassis manager typically has knowledge of the chassis state, current mode of operation, module presence, module power state, and whether particular modules support particular management network interfaces.

SUMMARY

In accordance with the teachings of the present disclosure, power consumption in an information handling system, e.g., a blade server chassis, may be reduced.

According to certain embodiments of the present disclosure, a method for automatically and dynamically controlling the power states of physical layer links (PHYs) in a modular information handling system is provided. A chassis manager automatically determines a status of at least one of the chassis manager and a managed chassis module of a modular information handling system. The chassis manager automatically identifies a PHY power down condition based at least on the determined status of at least one of the chassis manager and the managed chassis module, and in response to identifying the power down condition, the chassis manager powers down one or more management link PHYs associated with a management link between the chassis manager and the managed chassis module.

According to certain embodiments of the present disclosure, a modular information handling system includes a chassis, multiple managed chassis modules housed by the chassis, a chassis manager housed by the chassis, and a management fabric including management links for communicating management traffic between the chassis manager and the managed chassis modules. The chassis manager including logic instructions embodied in computer-readable media and executable by one or more processors for: automatically determining a status of at least one of the chassis manager and a particular managed chassis module; automatically identifying a PHY power down condition based at least on the determined status of at least one of the chassis manager and the particular managed chassis module; and in response to identifying the power down condition, automatically powering down one or more management link PHYs associated with a management link between the chassis manager and the particular managed chassis module.

According to certain embodiments of the present disclosure, a chassis manager for managing the power states of physical layer links (PHYs) in a modular information handling system including multiple managed chassis modules is provided. The chassis manager includes logic instructions embodied in computer-readable media and executable by one or more processors. The instructions are executable for automatically determining a status of at least one of the chassis manager and a particular managed chassis module; automatically identifying a PHY power down condition based at least on the determined status of at least one of the chassis manager and the particular managed chassis module; and in response to identifying the power down condition, automatically powering down one or more management link PHYs associated with a management link between the chassis manager and the particular managed chassis module.

BRIEF DESCRIPTION OF THE DRAWINGS

A more complete understanding of the disclosed embodiments and advantages thereof may be acquired by referring, by way of example, to the following description taken in conjunction with the accompanying drawings, in which like reference numbers indicate like features, and wherein.

DETAILED DESCRIPTION

Figure 1:
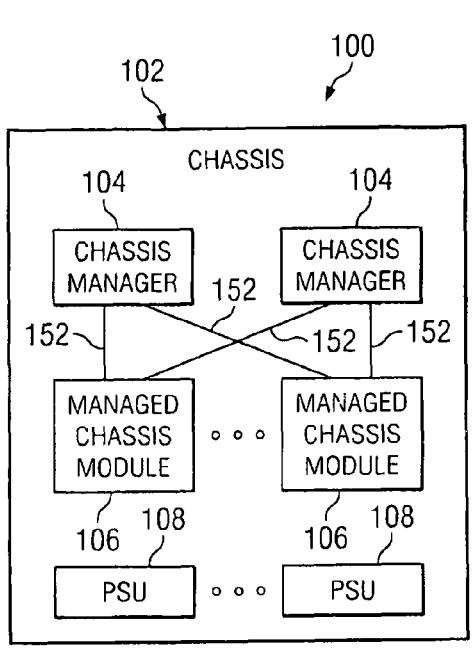
FIG. 1 illustrates an example modular information handling system (e.g., a modular server system), in accordance with certain embodiments of the present disclosure.
Figure 3:
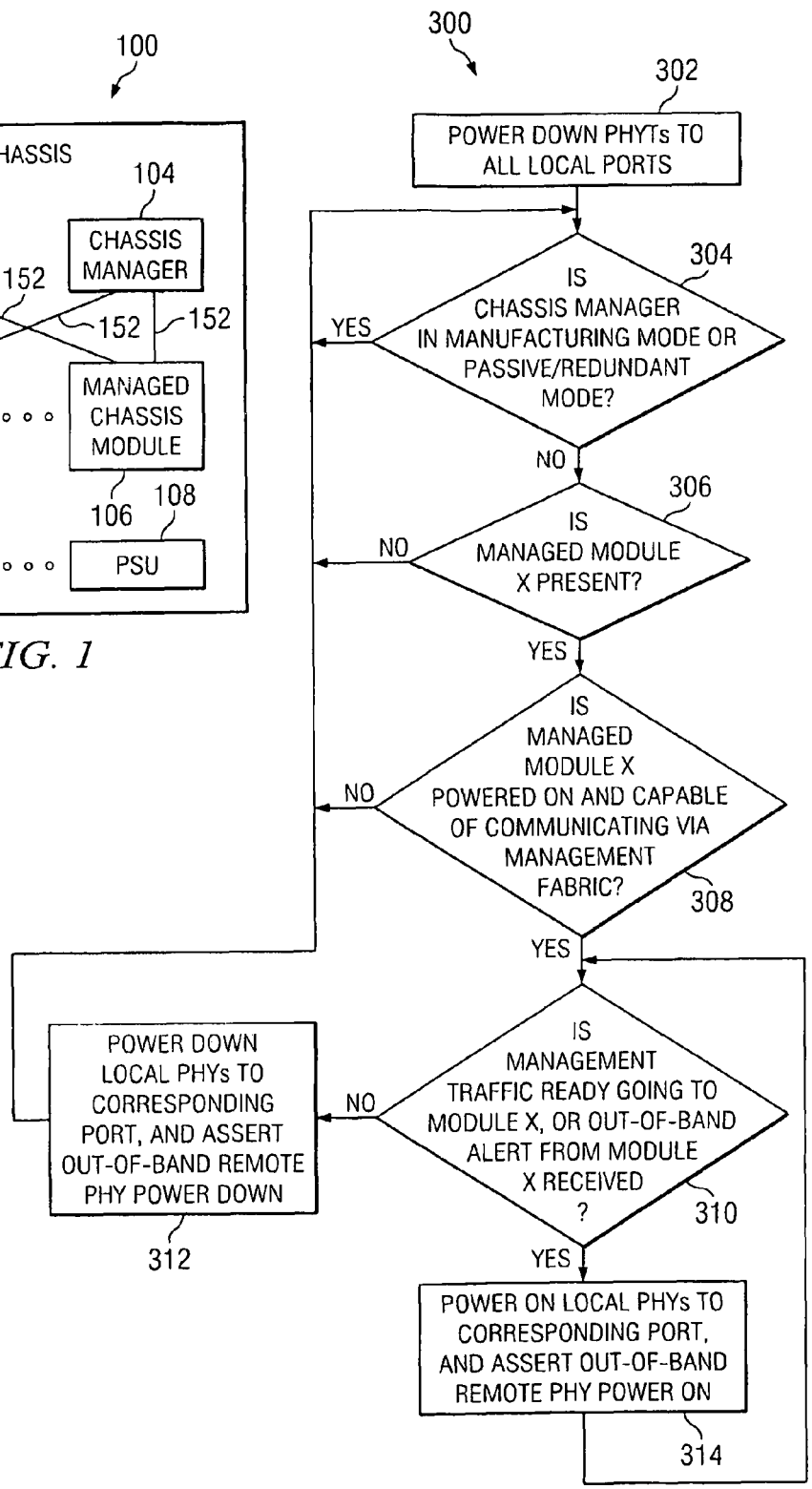
FIG. 3 illustrates a flowchart of an example method for automatically and dynamically controlling the power states of internal physical layer links (PHYs) in a modular server system, according to certain embodiments of the present disclosure.
Figure 2:
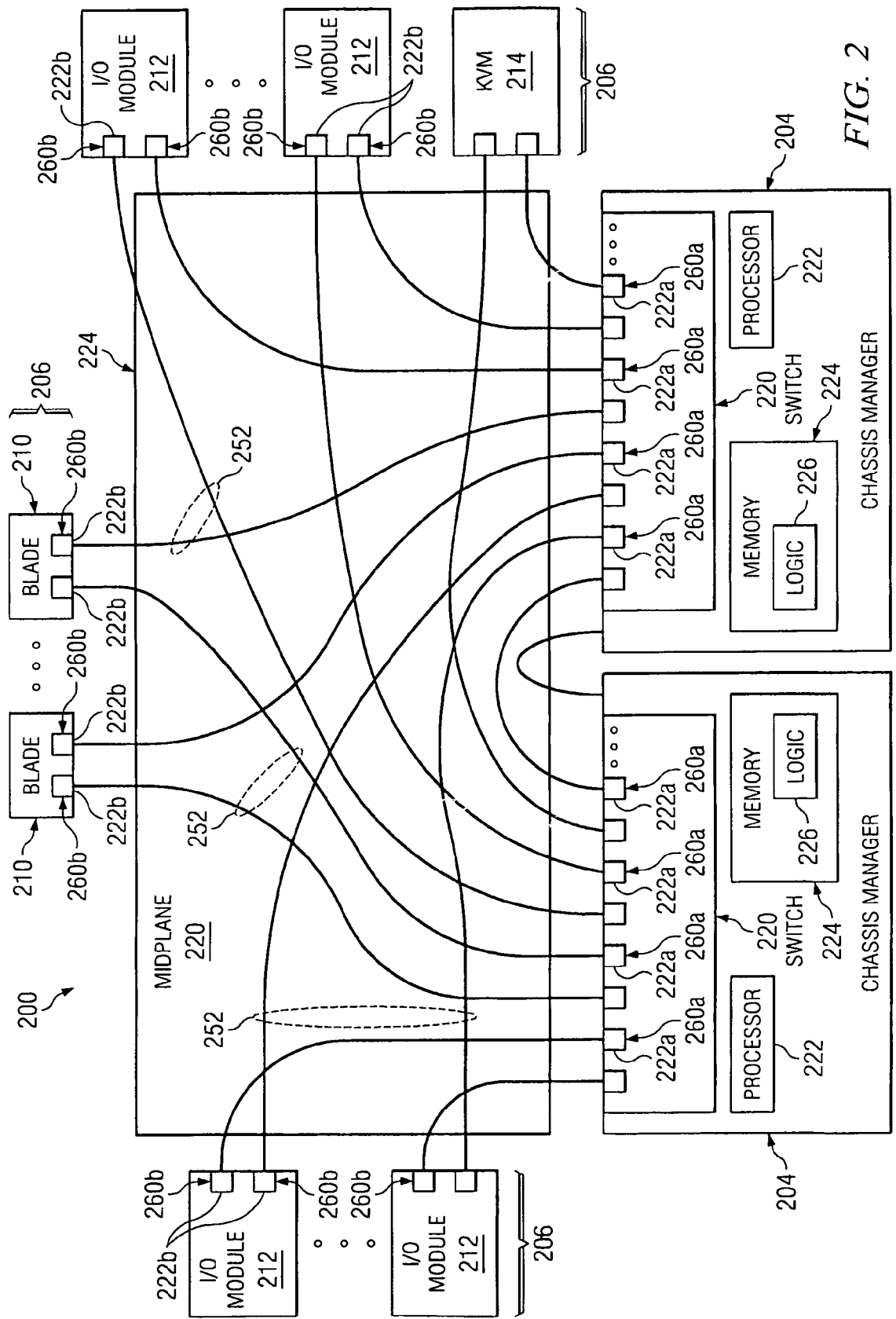
FIG. 2 illustrates an example blade server management fabric topology, according to certain embodiments of the present disclosure.

Preferred embodiments and their advantages are best understood by reference to FIGS. 1-3.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

For the purposes of this disclosure, a power supply unit (PSU) is a device or system that supplies electrical or other types of energy to an output load or group of loads. For example, a PSU for an information handling system may be a piece of hardware designed to convert AC power from the grid to low-voltage DC power outputs for internal components of the information handling system. As another example, a PSU may comprise a battery.

FIG. 1 illustrates an example embodiment of a modular information handling system 100 including a system for managing the power status of management link PHYs, in accordance with certain embodiments of the present disclosure. Modular information handling system 100 may include a chassis 102 housing one or more chassis managers 104, one or more managed chassis modules 106, one or more power supply units (PSUs) 108, and any other suitable information handling system components (e.g., fan modules). In some embodiments, modular information handling system 100 comprises a blade server (e.g., blade server 200 shown in FIG. 2) including any suitable number of blades. However, it should be understood that system 100 may comprise any other type of modular information handling system that includes a chassis manager and one or more managed chassis modules. Thus, the concepts disclosed herein may be applied to any suitable type of modular information handling system.

Managed chassis modules 106 may include any components of modular information handling system 100, including one or more blades (or other similar modules) one or more input/output (I/O) modules (e.g., multi-port Gigabit Ethernet switches, Fibre Channel Pass Through modules, etc.), one or more keyboard, video, mouse (KVM) modules, and/or any other type of modules that may be managed in any capacity by a chassis manager.

Managed chassis modules 106 are connected to chassis managers 104 by various communication links, including management links 152 for communicating management traffic from chassis managers 104 to managed chassis modules 106. Such management links 152 may form a management fabric. An example management fabric 214 shown in FIG. 2 and discussed below.

Each chassis manager 104 may provide various management functions for modular information handling system 100, including managing one or more aspects of each managed chassis module 106. For example, each chassis manager 104 may provide any of the following management functions for each managed chassis module 106: remote management capabilities, power management functions (e.g., monitoring and controlling PSUs), I/O module management, blade management, thermal management (e.g., fan control), Intelligent Platform Management Interface (IPMI), link tuning management, KVM management, monitoring system components, providing access to system information and status of components, voltage level control, monitoring of on/off power sequence, monitoring of system resets, etc.

In addition, as discussed in greater detail below, each chassis manager 104 is configured to selectively control the power states of PHYs at one or both ends of management links 152 between chassis manager 104 and managed chassis modules 106. In particular, chassis manager 104 may selectively power down PHYs (such that PSUs 108 do not provide power to such PHYs) at one or both ends of management links 152 based on various data available to chassis manager 104, in order to reduce the power drawn by such management links 152, thus providing power savings for system 100.

A chassis manager 104 may selectively control the power status of PHYs at one or both ends of particular management links 152 based on various data available, including, for example:

(a) whether the chassis manager 104 is in a manufacturing mode;

(b) whether the chassis manager 104 is in a passive mode or an active mode (e.g., in configurations including redundant chassis managers 104);

(c) whether a particular managed chassis module 106 is present/connected in chassis 102;

(d) whether a particular managed chassis module 106 is powered (e.g., by one or more PSU 108);

(e) whether a particular managed chassis module 106 has a pending alert that needs be serviced;

(f) whether the chassis manager 104 has pending management traffic targeted for a particular managed chassis module 106;

(g) whether a particular bay for receiving a managed chassis module 106 is not configured for having a link partner (e.g., various I/O modules types such as pass-throughs or a double height or double width blade that does not connect to the management fabric of the chassis manager 104); and/or (h) any other suitable data regarding the chassis manager 104, one or more managed chassis module 106, one or more PSU 108, or any other component of system 100.

Each chassis manager 104 may include, or have access to, any suitable hardware, software, and/or firmware for providing any of the functionality discussed herein, including the functionality related to controlling the power status of various PHYs. For example, chassis manager 104 may include, or have access to a processor and logic instructions (e.g., software and/or firmware) encoded in computer readable media and executable by the processor to provide any of the functionality discussed herein. A pair of example chassis managers 204 are shown and discussed in more detail below with reference to FIG. 2.

FIG. 2 illustrates an example management fabric topology 250 for a modular blade server 200, according to certain embodiments of the present disclosure. Blade server 200 includes one or more chassis managers 204 and one or more managed modules 206, along with various other components (e.g., PSUs, fans, etc.).

The illustrated embodiment includes two chassis managers 204, thus providing redundancy for handling a failure of one chassis manager 204. Each chassis manager 204 may include a switch 220, a processor 222, memory 224 storing logic 226, and/or any other suitable components. A chassis manager 204 may be configured to route communications within system 200, e.g., between multiple managed modules 206 and between chassis manager 204 and managed modules 206. Switch 200 may include any suitable number of ports 222a for connecting to any suitable number of managed modules 206 and/or the other chassis manager 204 via management links 252, as discussed below. For example, switch 200 may be a 24-port L2+ Ethernet switch.

In the illustrated example, managed modules 206 include one or more server blades 210, one or more I/O modules 212, and one or more KVM modules 214. Each server blade 210 may include any type of blade known to those skilled in the art. I/O modules 212 may include any devices suitable for communicating data to and/or from one or more blades 210, e.g., Gigabit Ethernet, Fibre Channel, and/or InfiniBand modules. An I/O module may be a passthrough or an active switch and may aggregate internal links to the chassis' outside connecting network, storage appliance(s), etc. A KVM module 214 may include any device allowing user control of multiple computers from a single keyboard, monitor, mouse, or other device.

Each managed module 206 may be received in a bay or similar structure of the chassis of system 200. Such bays or similar structures may include one or more ports 222b for connecting to chassis managers 204 via management links 252, as discussed below. When a managed module 206 is received in the bay, the managed module 206 may connect with the port(s) 222b of that bay.

Management fabric topology 250 may include any number of management links 252 between chassis managers 204 and managed modules 206. Such management links 252 may be provided by a midplane 254. Management links 252 may connect each managed module 206 to each chassis manager 204, thus providing a redundant system. A management link 252 may connect a port 222a of a chassis manager 204 with either (a) a port 222b associated with a managed module 206 bay or (b) a port 222a of another chassis manager 204. Additional management links 252 may connect one or more chassis managers 204 and/or managed modules 206 with any other components of system 200.

Each port 222a, 222b (collectively referred to as ports 222) may have an associated physical layer interface (PHY) 260a, 260b. Thus, each illustrated management link 252 has (a) a first PHY 260a at the chassis manager 204 end of the link, referred to herein as a "local PHY" 260a (from the perspective of the chassis manager 204), and (b) a second PHY 260b at the managed module 206 end of the link, referred to herein as a "remote PHY" 260b (from the perspective of the chassis manager 204).

Each management link 252 may include any suitable number of physical lines. For example, each management link 252 may include two differential pair or transmit (TX) and receive (RX), for a total of four physical lines per link. The links may be any suitable links for communicating data. As an example only, the links may be magnetic-less capacitively coupled 2 pair 100 Mbps twisted pair (TWP) Ethernet connections.

In this example embodiment, each chassis controller 204 may selectively control the power status (including powering down and powering up of local PHYs 260a and/or remote PHYs 260b of management links 252 based on various data available.

For example, each chassis controller 204 may power down one, some, or all local PHYs 260a if the chassis controller 204 identifies one or more local PHY power down conditions (i.e., conditions in which one or more local PHYs may be powered down), including for example:

(a) The chassis manager 204 is in a manufacturing mode in which chassis manager 204 cannot or does not have any link partners (e.g., using a production test fixture that includes loopbacks for test mode only). Here, the chassis manager 204 may power down all local PHYs 260a of the chassis manager 204.

(b) The chassis manager 204 is in a passive mode, as opposed to an active mode, which is relevant to redundant chassis manager configurations. Here, the chassis manager 204 may power down all local PHYs 260a of the chassis manager 204.

(c) One or more managed module bays are not populated with managed modules 206. Here, the chassis manager 204 may power down the local PHYs 260a corresponding to such unpopulated managed module bays (i.e., one, some, or all local PHYs 260a).

(d) One or more managed modules 206 are present in system 200, but not powered. Here, the chassis manager 204 may power down the local PHYs 260a corresponding to such unpowered managed modules 206 (i.e., one, some, or all local PHYs 260a).

(e) One or more particular bays for receiving managed modules 206 are not configured for having a link partner (e.g., various I/O modules types such as pass-throughs or a double height or double width blade that does not connect to the management fabric of the chassis manager 204). Here, the chassis manager 204 may power down the local PHYs 260a corresponding to such bays (i.e., one, some, or all local PHYs 260a).

Thus, chassis controller 204 may dynamically and automatically power down one, some, or all local PHYs 206a, which may reduce the power used by system 200.

In addition, each chassis controller 204 may power down one, some, or all remote PHYs 260b if the chassis controller 204 identifies particular remote PHY power down conditions (i.e., conditions in which one or more remote PHYs may be powered down). For example, chassis controller 204 may power down remote PHYs 260b corresponding to managed modules 206 for which no management traffic needs to be communicated.

As a particular example, chassis controller 204 may power down remote PHYs 260b corresponding to managed modules 206 for which:

(a) the managed module 206 has not pending alert that needs be serviced by chassis controller 204; and (b) chassis manager 104 has no pending management traffic targeted for the managed module 206.

In some situations, e.g., where the local PHYs 206a corresponding to remote PHYs 206b to be powered down are themselves currently powered down, chassis controller 204 may power down the remote PHYs 206b via an out-of-band channel/technique.

Thus, in some embodiments, chassis controller 204 may dynamically and automatically power down both the local PHYs 206a and the remote PHYs 206b corresponding to one, some, or all managed modules 206, which may reduce the power used by system 200.

FIG. 3 illustrates a flowchart of an example method 300 for automatically and dynamically controlling the power states of internal physical layer links (PHYs) in a modular server system, according to certain embodiments of the present disclosure. Method 300 is discussed with reference to system 200 of FIG. 2 for illustrative purposed only. Method 300 may be applied to any other suitable system.

At step 302, a chassis manager 204 may power down all local PHYs 206a of the chassis manager 104 (e.g., the PHYs 206a to all ports of switch 220 of the chassis manager 104). This may occur upon boot up of chassis manager 204 or at any other suitable time, and may be triggered manually or automatically upon some predetermined triggering event.

At step 304, chassis manager 204 (or another component) may determine whether chassis manager 204 is in a mode not configured for managing managed modules 206, e.g., a passive or redundant mode (as opposed to an active mode), a manufacturing mode, or other non-active-management mode. If chassis manager 204 is in a mode not configured for managing managed modules 206, the method may wait until chassis manager 204 enters a mode configured for managing managed modules 206.

If chassis manager 204 is in a mode configured for managing managed modules 206, the method proceeds to step 306. Steps 306-314 may then be performed for any one, some, or each managed module 206 in system 200.

At step 306, chassis manager 204 (or another component) may determine whether a managed module 206 is present in a particular chassis bay. If no managed module 206 is present in the particular chassis bay, the method may return as shown in FIG. 3. If a managed module 206 is present in the particular chassis bay, referred to for convenience as managed module X, the method may continue to step 308.

At step 308, chassis manager 204 (or another component) may determine whether managed module X is powered on and capable of communicating via management fabric 220. If not, the method may return as shown in FIG. 3. If managed module X is powered on and capable of communicating via management fabric 220, the method may continue to step 310.

At step 310, chassis manager 204 (or another component) may determine whether any management traffic regarding managed module X (e.g., either to or from managed module X) is pending. For example, chassis manager 204 (or another component) may determine whether (a) management traffic is ready to be sent to managed module X, (b) an out-of-band alert has been received from managed module X requiring communication of management traffic to and/or from managed module X, or (c) any other management traffic needs to be sent to and/or from managed module X.

If it is determined that no management traffic to and/or from managed module X is pending, the method may proceed to step 312. At step 312, chassis manager 204 may power off/down the PHYs 206 corresponding to the management link(s) 252 between chassis manager 204 and managed module X. For example, chassis manager 204 may power off/down (a) the local PHY(s) 206a to the port corresponding to managed module X, and (b) the remote PHY(s) 206b corresponding to managed module X. Chassis manager 204 may power off/down the remote PHY(s) 206b corresponding to managed module X by sending an out-of-band "power off" or "power down" signal to remote PHY(s) 206b associated with managed module X. If any of the PHYs 206 corresponding to the management link(s) 252 between chassis manager 204 and managed module X are already powered off/down, chassis manager 204 may simply maintain such power off/down status (instead of powering them off/down). After chassis manager 204 power off/down the PHYs 206 corresponding to the management link(s) 252 between chassis manager 204 and managed module X, the method may return to step 304, as shown in FIG. 3.

If it is determined that any management traffic to and/or from managed module X is pending, the method may proceed to step 314. At step 314, chassis manager 204 may power on the PHYs 206 corresponding to the management link(s) 252 between chassis manager 204 and managed module X. For example, chassis manager 204 may power on (a) the local PHY(s) 206a to the port corresponding to managed module X, and (b) the remote PHY(s) 206b corresponding to managed module X. Chassis manager 204 may power on the remote PHY(s) 206b corresponding to managed module X by sending an out-of-band "power on" signal to remote PHY(s) 206b associated with managed module X. If any of the PHYs 206 corresponding to the management link(s) 252 between chassis manager 204 and managed module X are already powered on, chassis manager 204 may simply maintain such power on status (instead of powering them on). The method may then return to step 310 to check for additional pending management traffic to and/or from managed module X.

As discussed above, chassis manager 204 may repeat steps 306-314 for one, some, or all managed modules 206. Chassis manager 204 may repeat this process at any defined frequency, upon a predetermined triggering event, or at any other suitable time.

Using method 300, local and/or remote PHYs in a management fabric may be selectively powered on as needed, rather than being constantly powered on. This may result in significant power savings, which may reduce the cost of system operation, as well as providing other benefits.

Although the present disclosure has been described in detail, it should be understood that various changes, substitutions, and alterations can be made hereto without departing from the spirit and the scope of the disclosure as defined by the appended claims.

What is claimed is:

1. A method for automatically and dynamically controlling the power states of physical layer links (PHYs) in a modular information handling system, the method comprising:
   automatically determining, by a chassis manager, a status of at least one of the chassis manager and a managed chassis module of a modular information handling system; and
   automatically identifying, by the chassis manager, a PHY power down condition based at least on the determined status of at least one of the chassis manager and the managed chassis module; and
   in response to identifying the power down condition, automatically powering down, by the chassis manager, one or more management link PHYs associated with a management link between the chassis manager and the managed chassis module, wherein:
      the management link between the chassis manager and the managed chassis module includes (a) at least one chassis manager PHY at a first end of the management link associated with the chassis manager, and (b) at least one managed chassis module PHY at a second end of the management link associated with the managed chassis module; and
      the chassis manager automatically powering down one or more management link PHYs comprises the chassis manager automatically powering down at least one chassis manager PHY at the first end of the management link and at least one managed chassis module PHY at the second end of the management link.

2. A method according to claim 1, wherein automatically determining a status of at least one of the chassis manager and a managed chassis module includes automatically determining at least one of:
   whether the chassis manager is in a manufacturing mode;
   whether the chassis manager is in a passive mode or an active mode;
   whether the managed chassis module is present in the chassis; and
   whether the managed chassis module is powered.

3. A method according to claim 1, wherein automatically determining a status of at least one of the chassis manager and a managed chassis module includes automatically determining at least one of:
   whether the managed chassis module has a pending alert to be serviced; and
   whether the chassis manager has pending management traffic targeted for the managed chassis module.

4. A method according to claim 1, comprising the chassis manager automatically identifying a PHY power down condition if the chassis manager is in a manufacturing mode or a passive mode.

5. A method according to claim 1, comprising the chassis manager automatically identifying a PHY power down condition if the managed chassis module is not present in the chassis or the managed chassis module is present in the chassis but not powered.

6. A method according to claim 1, comprising the chassis manager automatically identifying a PHY power down condition if the managed chassis module is not present in the chassis or the managed chassis module is present in the chassis but not powered.

7. A method according to claim 1, wherein:
   the modular information handling system comprises a modular server system including multiple server blades and one or more I/O devices; and
   the managed chassis module comprises one of the server blades or one of the I/O devices.

8. A modular information handling system, comprising:
   a chassis;
   multiple managed chassis modules housed by the chassis;
   a chassis manager housed by the chassis;
   a management fabric including management links for communicating management traffic between the chassis manager and the managed chassis modules;
   the chassis manager including logic instructions embodied in computer-readable media and executable by one or more processors for:
      automatically determining a status of at least one of the chassis manager and a particular managed chassis module;
      automatically identifying a PHY power down condition based at least on the determined status of at least one of the chassis manager and the particular managed chassis module; and
      in response to identifying the power down condition, automatically powering down one or more management link PHYs associated with a management link between the chassis manager and the particular managed chassis module, wherein:
         the management link between the chassis manager and the managed chassis module includes (a) at least one chassis manager PHY at a first end of the management link associated with the chassis manager, and (b) at least one managed chassis module PHY at a second end of the management link associated with the managed chassis module; and
         the chassis manager automatically powering down one or more management link PHYs comprises the chassis manager automatically powering down at least one chassis manager PHY at the first end of the management link and at least one managed chassis module PHY at the second end of the management link.

9. A modular information handling system according to claim 8, wherein the automatically determining a status of at least one of the chassis manager and a managed chassis module includes automatically determining at least one of:
   whether the chassis manager is in a manufacturing mode;
   whether the chassis manager is in a passive mode or an active mode;
   whether the managed chassis module is present in the chassis; and
   whether the managed chassis module is powered.

10. A modular information handling system according to claim 8, wherein automatically determining a status of at least one of the chassis manager and a managed chassis module includes automatically determining at least one of:

whether the managed chassis module has a pending alert to be serviced; and whether the chassis manager has pending management traffic targeted for the managed chassis module.

11. A chassis manager for managing the power states of physical layer links (PHYs) in a modular information handling system including multiple managed chassis modules, the chassis manager including logic instructions embodied in non-transitory computer-readable media and executable by one or more processors for:

automatically determining a status of at least one of the chassis manager and a particular managed chassis module;

automatically identifying a PHY power down condition based at least on the determined status of at least one of the chassis manager and the particular managed chassis module; and in response to identifying the power down condition, automatically powering down one or more management link PHYs associated with a management link between the chassis manager and the particular managed chassis module, wherein:

the management link between the chassis manager and the managed chassis module includes (a) at least one chassis manager PHY at a first end of the management link associated with the chassis manager, and (b) at least one managed chassis module PHY at a second end of the management link associated with the managed chassis module; and the chassis manager automatically powering down one or more management link PHYs comprises the chassis manager automatically powering down at least one chassis manager PHY at the first end of the management link and at least one managed chassis module PHY at the second end of the management link.

12. A chassis manager according to claim 11, wherein the automatically determining a status of at least one of the chassis manager and a managed chassis module includes automatically determining at least one of:

whether the chassis manager is in a manufacturing mode;

whether the chassis manager is in a passive mode or an active mode;

whether the managed chassis module is present in the chassis; and whether the managed chassis module is powered.

13. A chassis manager according to claim 11, wherein automatically determining a status of at least one of the chassis manager and a managed chassis module includes automatically determining at least one of:

whether the managed chassis module has a pending alert to be serviced; and whether the chassis manager has pending management traffic targeted for the managed chassis module.

* * * * *